United States Patent [19]

DeBurgh et al.

[11] 3,781,560

[45] Dec. 25, 1973

[54] NIGHT VIEWING SYSTEM FOR READING WITHOUT LIGHT

[75] Inventors: Raymond J. DeBurgh, Palm Springs, Calif.; Harold L. Novick, Wheaton, Md.

[73] Assignee: Raymond J. DeBurgh, Palm Springs, Calif.

[22] Filed: June 7, 1972

[21] Appl. No.: 260,420

[52] U.S. Cl. ........... 250/333, 250/213 VT, 250/372
[51] Int. Cl. ........................................... G01j 1/02
[58] Field of Search ................ 250/83.3 H, 83.3 HP, 250/83.3 UV, 330, 332, 333, 372, 213 VT

[56] References Cited

UNITED STATES PATENTS

| | | | |
|---|---|---|---|
| 3,130,310 | 4/1964 | Biberman et al | 250/83.3 UV |
| 3,277,303 | 10/1966 | Jensen et al. | 250/83.3 H X |
| 3,379,885 | 4/1968 | Nork | 250/83.3 H |
| 3,415,984 | 12/1968 | Frungel | 250/83.3 UV X |
| 3,509,344 | 4/1970 | Bouwers | 250/83.3 HP |

*Primary Examiner*—Archie R. Borchelt
*Attorney*—Roberts B. Larson et al.

[57] ABSTRACT

A night viewing system is provided for rendering visible proximate objects located in a totally darkened environment without the use of visible light, the system thus permitting one to read in bed at night without disturbing another person sleeping in the same room. The system comprises a nonvisible light source for irradiating the reading materials and binocular goggles for rendering visible the nonvisible light. The binocular goggles comprise a housing containing appropriate lens systems and a light frequency converter tube for converting the non-visible light into visible light. A strap attached to the goggles housing permits comfortable wearing by the user for relatively extended periods of time.

9 Claims, 6 Drawing Figures

PATENTED DEC 25 1973 3,781,560

SHEET 2 OF 2

NIGHT VIEWING SYSTEM FOR READING WITHOUT LIGHT

BACKGROUND OF THE INVENTION

1. Field of the Invention

This invention relates to a binocular viewing system for use in a darkened environment for close work such as reading.

2. Background of the Invention

A great number of people enjoy reading in bed at night before going to sleep. However, among married couples, for example, when the other spouse wishes to go to sleep such night reading can be a source of irritation in that the light required for reading can prevent that spouse from sleeping. In addition, people often find themselves in locations where they would like to read, but others would prefer to sleep. Thus, passengers in airplanes, trains and buses often find that either there is no provision for allowing some passengers to read without disturbing those passengers that desire to sleep, or if a reading light is provided, the light usually is shielded and does not provide sufficient illumination or permit flexibility in chosing reading position, requiring instead that tbe reader remain in an upright sitting position. Furthermore, occasions often arise when people have to see where they are going in a darkened environment, such as in a movie theater or a playhouse. As discussed below, the present invention overcomes these problems through the use of a radiation source for irradiating materials to be read with nonvisible light and binocular goggles wearable by the reader which convert light reflected from the materials being read into visible light.

A number of techniques are known for converting non-visible light into visible light. It is noted that the visible radiation spectrum is very narrow and that on either side of this spectrum there are bands of near-visible light radiation which can be rendered visible through the use of conventional techniques such as those employing special films and electronic tubes designed for this purpose. A patent to Bitner, U.S. Pat. No. 2,120,916, discloses a light frequency converter that permits the visual detection of non-visible light, such as infra-red radiation. Another patent, U.S. Pat. No. 3,478,216, to Carruthers, discloses an image converter for detecting radiation in the ultra-violet region and converting the radiation to visible light. A device for selectively viewing either visible light or infra-red radiation in a night telescope is disclosed in a Bouwers patent, U.S. Pat. No. 3,509,344. The telescope also is equipped with an infra-red search light for use to illuminate non-visibly an object to be viewed through the infra-red viewing section of the telescope.

SUMMARY OF THE INVENTION

This invention provides a relatively inexpensive system which permits extended viewing of close objects in a totally darkened environment without visible light. As noted above, the invention includes goggles or the like which are worn by the user to permit the wearer full use of his hands. Further, also as noted, the invention is particularly adapted to enable one person to read in bed without disturbing a second person sleeping in the same room.

According to a presently preferred embodiment thereof, the invention comprises a night viewing system used to "illuminate" the materials to be read that includes a source for emitting non-visible light radiation and binocular goggles comprising a housing having a front face and a substantially arcuate rear face of a shape conforming generally to the curvature of the human face, a front objective lens system, transparent only to light radiation in the near visible spectrum and opaque to visible light, for receiving the non-visible light radiation reflected from irradiated materials, a light image converter means in optical alignment behind the front objective lens system for converting the non-visible light radiation transmitted therethrough into visible light radiation, and two eye lens systems located behind and in optical alignment with the converter means, and a means for mounting the goggles on the head of the user so as to permit viewing through the lens system.

Other features and advantages of the present invention will be set forth in or apparent from the detailed description of preferred embodiments of the invention found hereinbelow.

DESCRIPTION OF THE PREFERRED EMBODIMENTS

Figure 1:
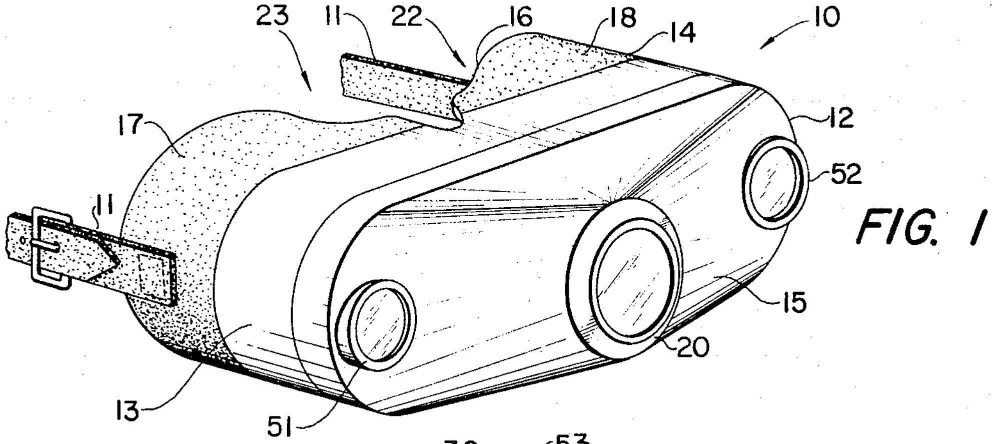
FIG. 1 is a front perspective view of an embodiment of the invention which includes a monocular objective lens system and a light radiation source mounted on the housing of the goggles.

Referring to FIG. 1, a monocular objective lens goggles system is depicted that comprises goggles 10, means connectable to goggles 10 for mounting them on the head of the user in the form of a strap 11, and a source of non-visible light radiation comprising light sources 51 and 52. Goggles 10 comprise a housing 12 having sides 13 and 14, a front face 15 and a substantially arcuate rear face 16 that extends rearwardly at sides 13 and 14 so as to form eyeshields 17 and 18, respectively. Goggles 10 further comprise a monocular front objective lens system indicated at 20 and a binocular eye lens system that includes a first eye lens system and a second eye lens system (not shown but generally located at 22 and 23, respectively) which are laterally separated by the required interocular distance for viewing with both eyes.

Light sources 51 and 52 emit light radiation only in the near visible light spectrum which may be generally defined as that part of the electromagnetic radiation spectrum which has on either side of, and which is relatively close in frequency to, the visible light specturm.

More particularly, the near visible light spectrum is comprised of infra-red light radiation which has a frequency less than the minimum visible light frequency, and ultraviolet light radiation which has a frequency greater than the maximum visible light frequency. The internal components of goggles 10 depend upon the non-visible light source that is utilized and it will be understood that the invention is not limited to one particular type of non-visible light radiation. However, because the technology of converting non-visible light into visible light is more advanced in the infra-red region of the near visible light spectrum, this invention will be described with regard to components that use light in that spectrum.

Light source 51 is located along and substantially parallel to side 13 of goggles housing 12 and extends substantially from front face 15 to rear face 16. Ligh source 52 is located along and substantially parallel to side 14 of goggles housing 12 and similarly extends substantially from front face 15 to rear face 16. Both infrared and ultraviolet light sources are well known in the art and the specific details of the construction of these light sources forms no part of the invention.

Goggles housing 14 is constructed so as to provide a comfortable fit thereby enabling the user to wear goggles 10 for relatively extended periods and while in various body positions, including reclining and standing positions. Rear face 16 has a shape conforming generally to the curvature of the human face, thereby providing a light proof seal and enhancing the wearing comfort of the goggles. In addition, goggles housing 15 can be made of a light weight plastic which provides the requisite strength, while at the time does not add significantly to the weight of the goggles. The eye shields 17 and 18 can be made of a soft, pliable rubber or plastic so as to further enhance the wearing comfort.

Figure 6:
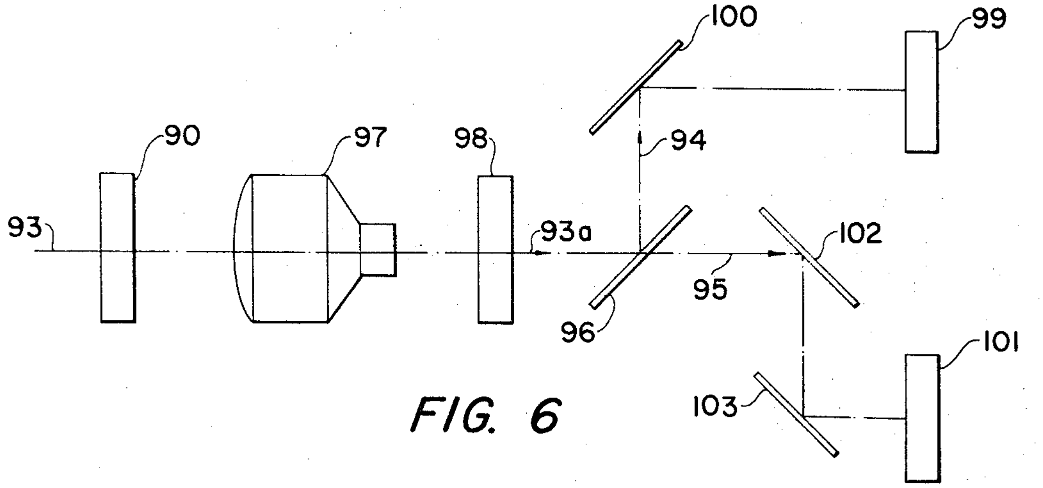
FIG. 6 is a schematic of the lens system of yet another embodiment of the invention usable in the embodiment depicted in FIG. 1.

An internal lens system having a monocular objective lens system and a binocular eye lens system and usable in goggles 10 is depicted in FIG. 6. The internal lens system comprises a monocular objective lens system 90 having an optical axis 93, perpendicular to and co-axial with objective lens system 90, an infrared image converter 97 in alignment with objective lens system 90 on axis 93, a collimation lens 98 optically coupled to converter 97, and a beam splitter in the form of a half-silvered mirror 96. Half-silvered mirror 96 splits a beam 93a transmitted along optical axis 93 into a first, reflected beam 94 consisting of the reflected light radiation from half-silvered mirror 96 and into a second, transmitted beam 95 consisting of the light radiation transmitted through half-silvered mirror 96. Reflected beam 94 then is coupled to an eye lens system 99 by an optical direction changing device, such as flat mirror 100. Transmitted beam 95 is coupled to a second eye lens system 101 by further optical direction changing devices, such as flat mirrors 102 and 103. Transmitted beam 95 is adjusted such that the phase of the light radiation at eye lens system 101 is equal to the phase of the light radiation at eye lens system 99. The easiest way of eliminating the phase difference between the two eye lens systems is to insure that the path length traveled by the transmitted beam 95 equals the path length traveled by reflected beam 94 so as to compensate for the effect of the additional light directing device, i.e. mirror 103, included in the path of the transmitted beam 95.

Objective lens system 90 and eye lens systems 99 and 101 may take forms well known in the art and the details of construction form no part of the present invention. The purpose of objective lens system 90 is to collect and admit, or be transparent to only non-visible light, lens system 90 blocking out or being opaque to visible light. Lens system 90 also serves to focus the admitted light onto infra-red image converter 97. A specific filter can be used to block out the undesired visible light or a lens system can be provided with a suitable coating for this purpose. Eye lens systems 99 and 101 transmit and focus the visual image formed by converter 97 as an erect image to the eyes of the user.

Figure 2:
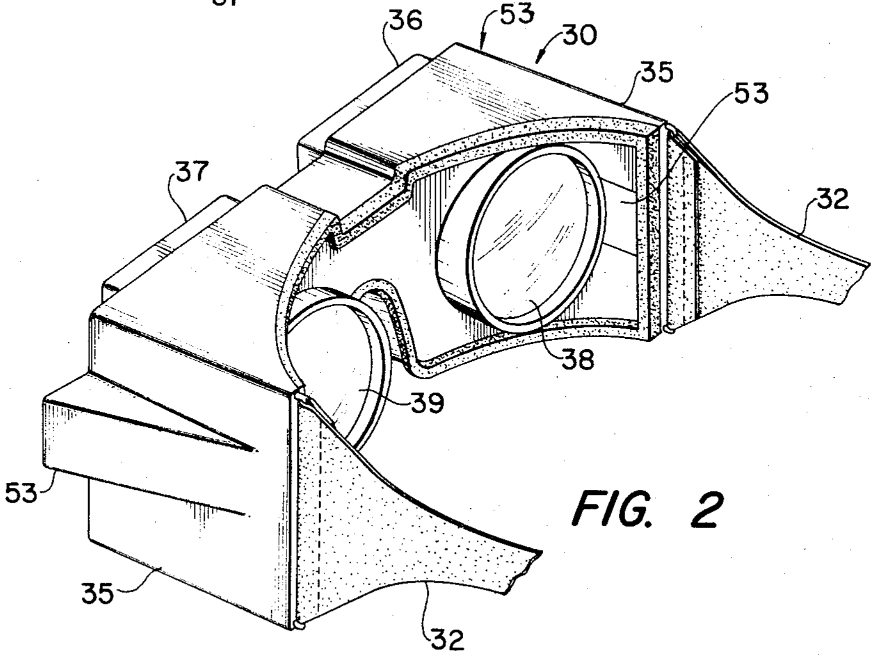
FIG. 2 is a rear perspective view of another embodiment of the invention which includes a binocular objective lens system and a light radiation source mounted on the housing of the goggles.

A second embodiment of the invention which includes a binocular objective lens system and a non-visible light radiation source integral with the goggles is shown in FIG. 2. The night viewing goggles system comprises goggles 30, a strap 32 and light sources 53, the goggles 30 themselves comprising housing 35, objective lens systems 36 and 37, and eye lens systems 38 and 39. The external construction of the goggles 30 is similar to that of the goggles of FIG. 1 and hence further description of this construction is not seen to be necessary.

Figure 4:
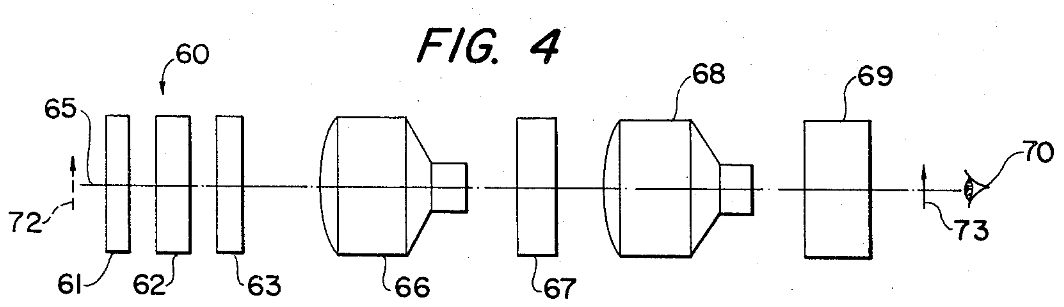
FIG. 4 is a schematic of the lens system of one embodiment of the invention in which only one side of a binocular set of lenses is depicted.

The internal lens system of goggles 30 for one optical axis is shown in FIG. 4. An objective lens system 60 is comprised of a filter 61, an objective lens 62 and a collimation lens 63. Objective lens system 60 defines an optical axis 65 which is perpendicular to and co-axial with objective lens system 60. Located on optical axis 65, behind and optically coupled to objective lens system 60, is an infrared image converter tube 66, which is, in turn, optically coupled to a second collimation lens system 67 located on optical axis 65. An image intensifier tube 68 intensifies the image from second collimation lens 67 and transmits the strengthened image to an eye objective lens system 69, which optically amplifies and conditions the intensified image received from image intensifier tube 68 for the eye of the observer, which is indicated schematically at 70. An infrared object is shown diagrammatically by a dashed arrow, denoted 72, and the image converted into the visible light spectrum is shown by a solid arrow, denoted 73.

Figure 5:
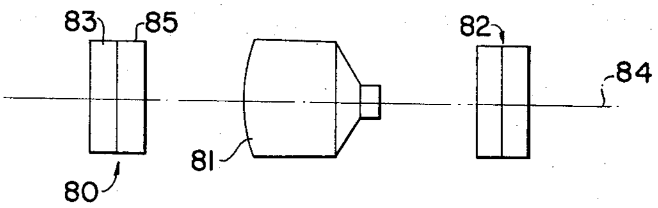
FIG. 5 is a schematic of the lens system of another embodiment of the invention in which only one side of a binocular set of lenses is depicted.

Alternatively, the lens system shown in FIG. 5 can be used in goggles 30. The lens system of this embodiment is comprised of an objective lens system 80, an infrared image converter 81 and an eye objective lens 82. Objective lens system 80 includes an objective lens 83 optically coupled to a filter 85 that is opaque to visible light radiation and is transparent to infra-red radiation. Objective lens 83 can be a magnifying lens or a wide angle lens, in which case eye lens systems 82 can incorporate a magnifying lens therein.

Figure 3:
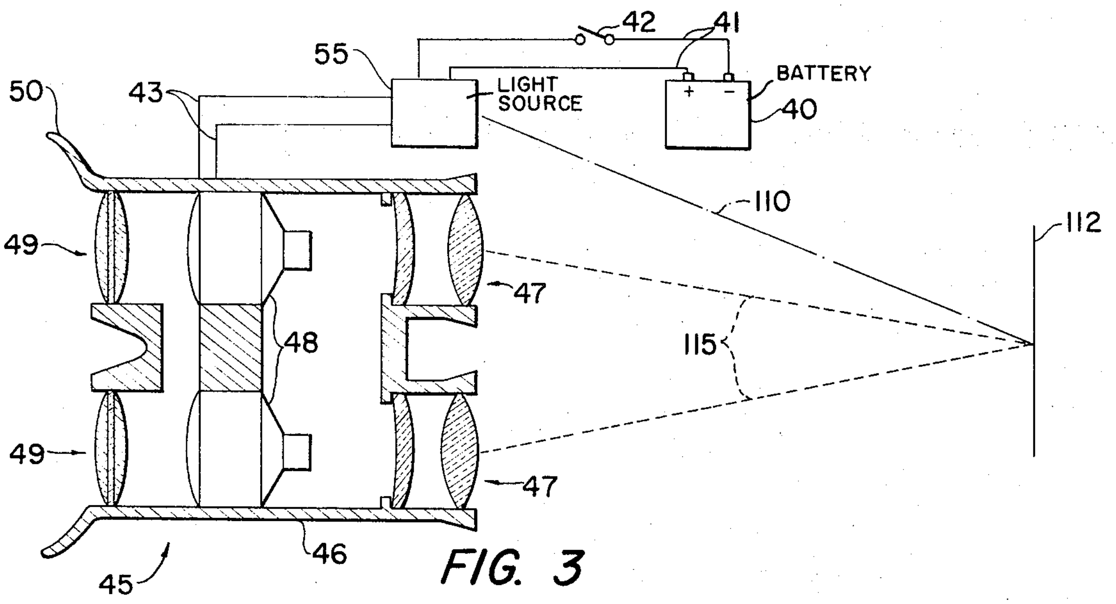
FIG. 3 is a sectional plan view of another embodiment of the invention which includes a binocular objective lens system and a light radiation source physically separate from the goggles housing.

Referring to FIG. 3, a third embodiment of the invention is shown which includes binsocular goggles 45 and a non-visible radiation or light source 55 that is not physically mounted on the goggles housing. Light source 55 is electrically connected to an electrical power source, such as a battery 40, through a pair of leads or conductors 41 and a main power switch 42 is connected in series between battery 40 and ight source 55. A further pair of leads 43 connect power supply 40 to goggles 45 such that switch 42 also controls the power thereto. Goggles 45 comprise a housing 46, objective lens systems 47, an image converter device for converting the non-visible light radiation into visible radiation, such as infra-red converter tubes 48, and eye lens systems 49. Goggles 45 also include a padded eye shield 50 attached to housing 46.

It will be understood that the lens system used with a particular goggles system can vary and hence that the invention is not restricted to any of the above described embodiments. The considerations in choosing a particular lens system for a specific goggles system include cost, size of the goggles, size and location of the light source and overall weight of the goggles system.

Considering the operation of the invention, the viewing system is operated by first energizing the non-visible infra-red light source and image converter tubes from a suitable electrical source, such as by closing switch 42 of FIG. 3 to electrically couple battery 40 to light source 55 and goggles 45. Although only the operation of the embodiment of the goggles system of FIG. 3 will be described, it will be understood that the operation of the other embodiments is similar. Referring to FIG. 3, light source 55 is positioned so that non-visible infra-red light radiation 110 strikes the object to be made "visible" which is indicated at 112. The incoming infra-red light radiation 110 is reflected from object 112, so that the reflected non-visible infra-red light radiation, denoted 115, strikes objective lens system 47 of goggles 45. Objective lens system 47 focuses the light radiation on the lens of infra-red image converter tube 48. In a manner well known in the art, infra-red image converter tube 48 convertes the reflected non-visible infra-red radiation into visible light radiation. The visible light radiation is then amplified or magnified by eye lens system 49 in a manner that is well known in the art for viewing by the eye of the observer.

In addition, further variations of a lens system in accordance with the invention can include a lens system that is comprised of a plurality of layers of sensitized material, each layer superimposed over adjacent layers so as to form a unitary construction. The outermost layer in this further variation could comprise a material that emits electrons upon illumination with light-radiation only in the near visible spectrum. Succeeding layers could comprise materials that luminesce in the visible spectrum when irradiated by electrons and comprise lenses that appropriately focus the luminescent light. These materials are wellknown in the art and further disclosure herein is not deemed to be necessary.

As discussed hereinabove, a preferred use of the viewing system of the invention is to permit one person to read in bed while another person in the same room is left undisturbed by any visible light, the reading material being illuminated with the non-visible radiation and the reader wearing a pair of night viewing goggles in accordance with the invention. As discussed above, the goggles collect the non-visible light radiation reflected from the illuminated reading material with a lens system that is opaque to visible light radiation, and focus the visible light radiation for viewing by the eyes of the reader. Of course, the use of the viewing system is not to be construed as limited solely to reading in bed and the system can be used for close-at-hand work that must be done in the dark. In addition, the viewing system can be equipped with a portable electrical supply and the viewing system can be used in working in totally darkened areas.

Although the invention has been described in detail with respect to exemplary embodiments thereof, it will be understood by those of ordinary skill in the art that variations and modifications may be effected within the scope and spirit of the invention.

We claim:

1. A viewing system for use in reading at night or the like, without visible light, said system comprising means for irradiating the material to be read with light radiation exclusively in the near visible spectrum;

and a single goggles unit wearable by the reader comprising means for supporting the unit on the head of the reader, and a lens system through which the materials to be read are viewed including means transparent to light radiation in the near visible spectrum and opaque to light radiation in the visible spectrum for receiving near visible light radiation reflected from the materials to be read, light converter means for converting near visible light radiation into visible light, and means for conditioning the visible light output of said light converting means for viewing by the reader.

2. A viewing system as claimed in claim 1 wherein said irradiating means is incorporated into said single goggles unit.

3. A night viewing system as claimed in claim 1 wherein said irradiating means is incorporated into said single goggles unit and wherein said goggles unit further comprises a housing having a front face and a substantially arcuate rear face having a shape conforming generally to the curvature of the human face; said lens system comprising:

a front objective lens system transparent only to light radiation in the near visible spectra and opaque to visible light radiation for receiving the non-visible light radiation reflected from the irradiated object, said lens system located within said housing at the front face;

light converter means located within said housing in optical alignment behind said front objective lens system for converting the non-visible light radiation transmitted through said front object lens system into visible light radiation; and two rear eye lens systems located within said housing at the rear face behind and in optical alignment with said converter means, said eye lens systems being laterally separated by the required interocular distance for viewing with both eyes.

4. A night viewing system as claimed in claim 3 wherein said irradiating means is comprised of a first light supply and a second light supply, said first light supply located along one side of said housing and said second light supply located along the other side of said housing.

5. A night viewing system as claimed in claim 1 wherein said transparent means comprises two independent subsystems, a first subsystem for one ocular light path and a second subsystem for the other ocular light path, each said subsystem being arranged along a respective optical axis and comprising:

a filter opaque to visible light radiation and transparent to near visible light radiation, and a front objective lens; and wherein said light converter means comprises two converter means, a first converter means in optical alignment with said first subsystem and a second converter means in optical alignment with said second subsystem, each eye lens system being in optical alignment with a respective said image converter means.

6. A night viewing system as claimed in claim 5, and further icluding:

first and second collimation lenses respectively located behind said first and second converter means in optical alignment therewith, each lens being located such that the focal plane thereof coincides with the image screen of said respective converter means; and first and second image intensifier tubes respectively located between said first and second collimation lenses and said first and second eye lens system.

7. A night viewing system as claimed in claim 1 whereas said conditioning means comprises a first rear eye lens system and a second rear eye lens system, said first and second rear eye lens system being separated by the required interocular distance for viewing with both eyes; and said night viewing system further including a collimation lens located behind said converter means in optical alignment therewith and located such that the focal plane thereof coincides with the image screen of said respective converter means; means in optical alignment with said collimation lens for splitting the light radiation passing therethrough into a first beam comprising the reflected light radiation and into a second beam comprising the transmitted light radiation; first means for optically coupling said first beam to said first rear eye lens system; second means for optically coupling said second beam to said second rear eye lens system, said second means being located such that the phase of the light radiation in the second eye lens system is equal to the phase of the light radiation in the first eye lens system.

8. A night viewing system as claimed in claim 1 wherein said irradiating means emits only infra-red light radiation, said transparent means is transparent only to infra-red light radiation and said light converter means converts the infra-red light radiation transmitted by said transparent means into visible light radiation.

9. A night viewing goggles system as claimed in claim 1 wherein said irradiating means emits only ultraviolet light radiation, said transparent means is transparent only to ultraviolet light radiation and said light converter means converts the ultraviolet light radiation transmitted by said transparent means into visible light radiation.

* * * * *